United States Patent
Quilling, II

(10) Patent No.: US 7,430,110 B2
(45) Date of Patent: Sep. 30, 2008

(54) MODULAR AUTO STEREO MOUNTING KIT HAVING BOTH SINGLE DIN AND DOUBLE DIN CONFIGURATIONS

(75) Inventor: R. Spencer Quilling, II, Deland, FL (US)

(73) Assignee: Metra Electronics Corp., Holly Hills, FL (US)

( * ) Notice: Subject to any disclaimer, the term of this patent is extended or adjusted under 35 U.S.C. 154(b) by 265 days.

(21) Appl. No.: 11/507,354

(22) Filed: Aug. 18, 2006

(65) Prior Publication Data

US 2008/0043408 A1     Feb. 21, 2008

(51) Int. Cl.
*H05K 5/00* (2006.01)
(52) U.S. Cl. ...................................... 361/679
(58) Field of Classification Search ................ 361/679, 361/681, 728, 731, 733; 248/27.3; 439/301, 439/638
See application file for complete search history.

(56) References Cited

U.S. PATENT DOCUMENTS

| | | | | |
|---|---|---|---|---|
| 3,858,091 A | * | 12/1974 | Wilkinson | 361/724 |
| 4,756,495 A | * | 7/1988 | Putnam | 248/27.3 |
| 5,560,572 A | * | 10/1996 | Osborn et al. | 248/27.3 |
| 6,651,936 B2 | * | 11/2003 | Upson et al. | 248/27.3 |
| D508,486 S | * | 8/2005 | Quilling, II | D14/224 |
| 2003/0160134 A1 | * | 8/2003 | Upson et al. | 248/27.3 |

* cited by examiner

*Primary Examiner*—Chandrika Prasad
(74) *Attorney, Agent, or Firm*—J. Wiley Horton

(57) ABSTRACT

A mounting kit having dual compatibility for mounting either a single DIN component or a double DIN component. The mounting kit includes a combination aperture large enough to receive a double DIN component. A removable member extends horizontally between the left vertical side and the right vertical side of the combination aperture. The removable member is attached to the vertical sides by severable joints. The removable member divides the combination aperture into a single DIN aperture suitable for mounting a single DIN component and an auxiliary aperture configured to receive an auxiliary device, such as a pocket. The removable member may be removed from the combination aperture to mount a double DIN type component.

15 Claims, 10 Drawing Sheets

MODULAR AUTO STEREO MOUNTING KIT HAVING BOTH SINGLE DIN AND DOUBLE DIN CONFIGURATIONS

BACKGROUND OF THE INVENTION

1. Field of the Invention

This invention relates to the field of automotive audio and video components. More specifically, this invention comprises a modular component mounting kit having both single DIN and double DIN configurations.

2. Description of the Related Art

Many vehicle owners seek to securely install a variety of audio and video components in their vehicles. Various mounting kits have been designed to mount these components in factory-formed apertures. Aftermarket audio or video components are usually either of an ISO-mount type or of a DIN-mount type. Increasingly, ISO-type components are becoming obsolete as most manufacturers have switched to the exclusive production of DIN-type units. For those readers unfamiliar with the "DIN" acronym, it stands for Deutsches Institute fur Normung. The English translation is roughly "German Institute for Standardization." It is the organization which promulgates the DIN standards.

DIN-type components have standard body sizes and a standard pattern of mounting holes on the vertical sides of the components. They are generally available in two sizes—single DIN and double DIN. Although single DIN units are the most common, double DIN units are becoming increasingly popular, particularly for video, navigation, and touch-screen applications. A double DIN component provides a larger surface facing the user, which allows for larger LCD navigation screens and similar items.

Currently, vehicle owners and component installers must purchase separate mounting kits depending upon whether a single DIN-type component or a double DIN-type component is used. The mounting kit is often complex, since it must mimic a portion of the vehicle's stock interior trim.

Those skilled in the art will know that vehicle manufacturers seldom provide DIN-standard dash apertures. To the contrary, the manufacturers often create proprietary apertures so that the vehicle owner will have to purchase replacement components from the manufacturer. Thus, a kit manufacturer must typically provide a replacement fascia which resembles a portion of the original vehicle's dash, but which substitutes a standard DIN aperture for the proprietary aperture found on the original vehicle.

This requirement has typically necessitated the creation of two complete fascias—one including a single-DIN aperture and one including a double-DIN aperture. As the fascias are complex molded parts, the tooling and development costs associated with maintaining two separate fascias is considerable.

The requirement for two separate fascias has also been a burden for vendors and installers of aftermarket components. They have been forced to carry two parts kits (one single DIN and one double) or ask the customer to wait while the appropriate part kit is ordered. It is therefore desirable to provide an installation kit for installing aftermarket components in which a single fascia can accommodate both single DIN and double DIN configurations.

BRIEF SUMMARY OF THE INVENTION

The present invention is a mounting kit having dual compatibility for mounting either a single DIN component or a double DIN component. The mounting kit includes a combination aperture large enough to receive a double DIN component. A removable member extends horizontally between the left vertical side and the right vertical side of the combination aperture. The removable member is attached to the vertical sides by severable joints. The removable member divides the combination aperture into a single DIN aperture suitable for mounting a single DIN component and an auxiliary aperture configured to receive an auxiliary device, such as a pocket. The removable member may be removed from the combination aperture in order to accommodate a double DIN type component.

REFERENCE NUMERALS IN THE DRAWINGS

| | | | |
|---|---|---|---|
| 10 | single DIN component | 12 | main body |
| 14 | interface panel | 16 | vertical side |
| 18 | holes | 20 | right-side mounting bracket |
| 22 | left-side mounting bracket | 24 | slots |
| 26 | engaging ramp | 28 | groove |
| 30 | double DIN component | 32 | main body |
| 34 | interface panel | 36 | vertical side |
| 38 | hole | 40 | right-side mounting bracket |
| 42 | left-side mounting bracket | 44 | slot |
| 46 | engaging ramp | 48 | groove |
| 50 | fascia | 52 | vent aperture |
| 54 | hazard indicator aperture | 56 | combination aperture |
| 58 | single DIN aperture | 60 | removable member |
| 62 | vertical sides | 64 | severable joint |
| 66 | auxiliary aperture | 68 | tab receiver |
| 70 | auxiliary receiver | 72 | pocket |
| 74 | pocket trim | 76 | snap finger |
| 78 | single DIN trim | 80 | tabs |
| 82 | double DIN trim | 84 | tabs |
| 86 | double DIN aperture | | |

DETAILED DESCRIPTION OF THE INVENTION

Figure 1:
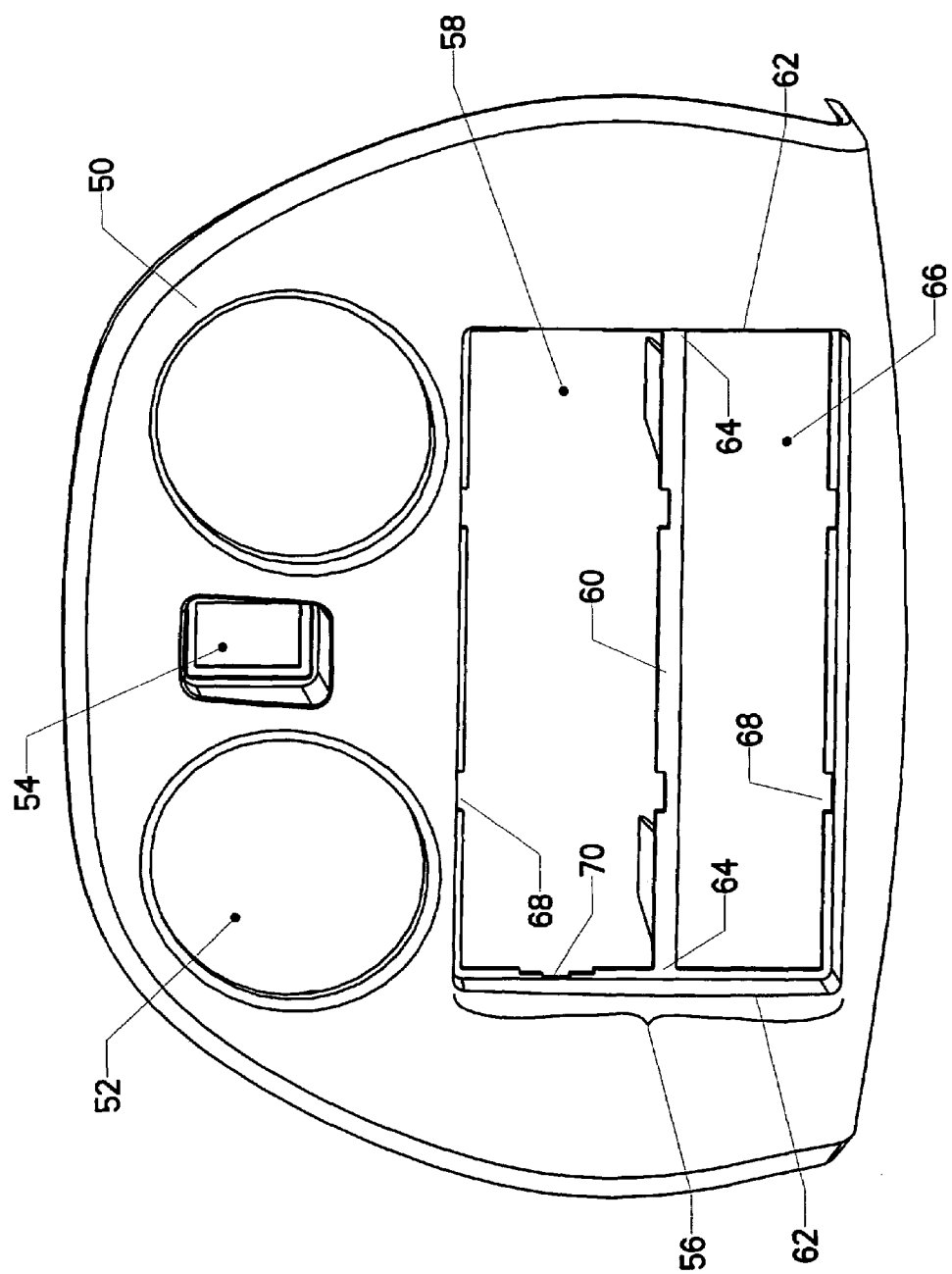
FIG. 1 is a perspective view, showing a vehicle-specific fascia with a combination aperture.

The present invention is a mounting system having dual compatibility for mounting either a single DIN component or a double DIN component. Fascia 50 is illustrated in FIG. 1. It is a non-OEM, vehicle-specific fascia. Fascia 50 is designed to replace the OEM fascia of the vehicle and is particularly useful for creating a "custom" appearance when installing an aftermarket component. It attaches to the vehicle's structure using conventional fasteners (not shown).

The specific example illustrated is configured to mount to the dashboard of Mitsubishi Eclipses of certain model years. However, the invention hereinafter claimed is in no way limited to any particular fascia type. Thus, the reader should bear in mind throughout this disclosure that the particular shape and configuration of the fascia shown outside of the DIN aperture(s) should be viewed as exemplary only.

The fascia 50 shown has a pair of vent apertures 52 to accommodate the center HVAC vents of the vehicle. Hazard indicator aperture 54 is also provided for mounting the vehicles hazard indicator light control button. Similar features will be found on many different types of automobiles, and the fascia is preferably designed to accommodate these existing features.

Figure 1B:
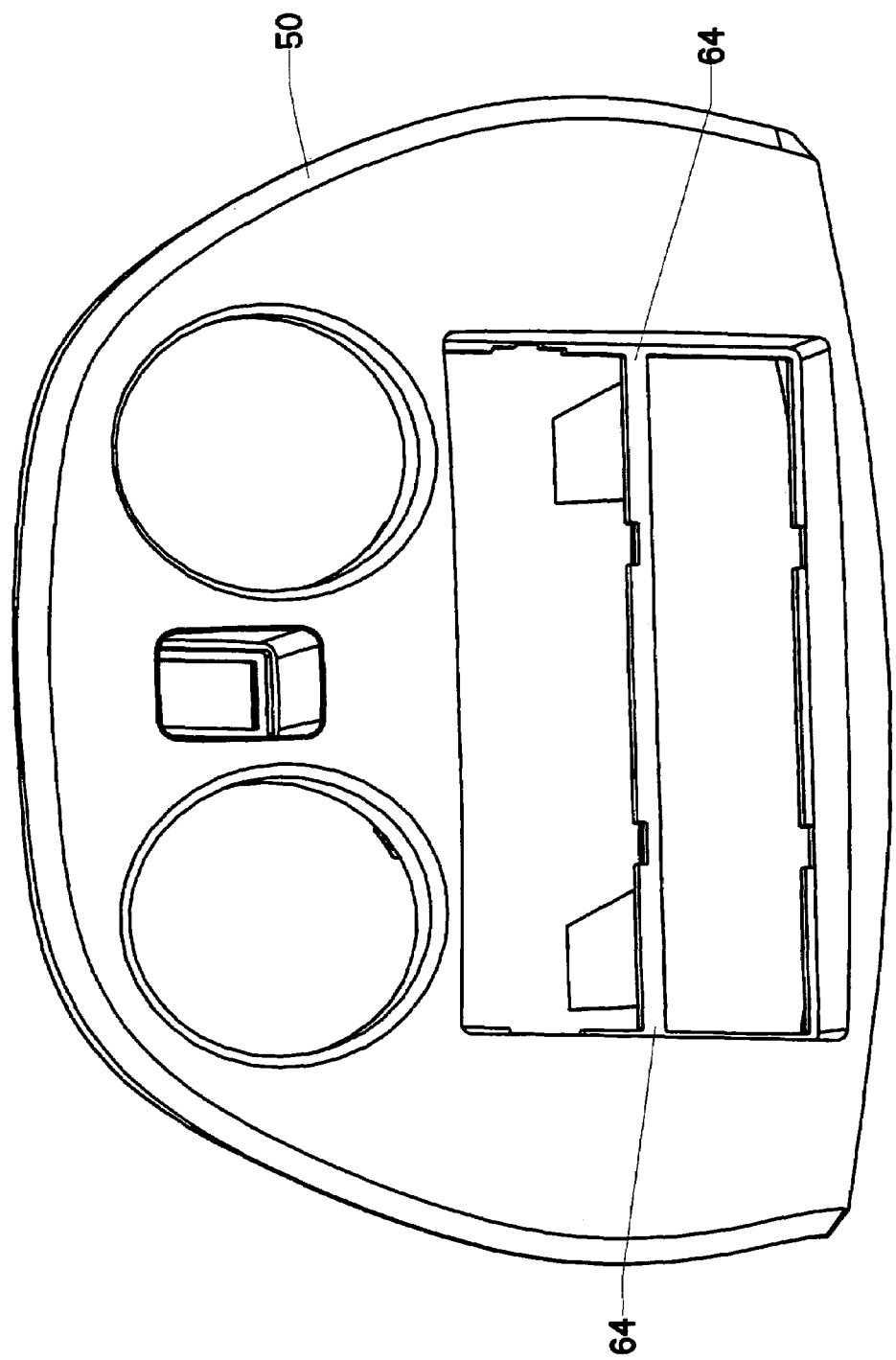
FIG. 1B is a perspective view, showing the fascia of FIG. 1 from a different viewpoint.

Fascia 50 includes combination aperture 56. Combination aperture 56 has vertical sides 62 on the left and right side. Removable member 60 is attached to vertical sides 62 by a severable joint 64 on each end (FIG. 1B provides a better view of the severable joint on the right side). Removable member 60 divides combination aperture 56 into two smaller apertures—single DIN aperture 58 and auxiliary aperture 66. Tab receivers 68 are provided along the top and bottom sides of combination aperture 56 and along removable member 60. Tab receivers 68 are used to attach trim material to fascia 50, as will be described subsequently.

Auxiliary receivers 70 are provided on the left and right vertical sides 62 of single DIN aperture 58. Auxiliary receivers 70 may be used to mount a standardized ISO audio component using mounting brackets described and illustrated in U.S. Pat. No. 6,651,936 B2 to Upson et al., which patent is hereby incorporated by reference.

Figure 2:
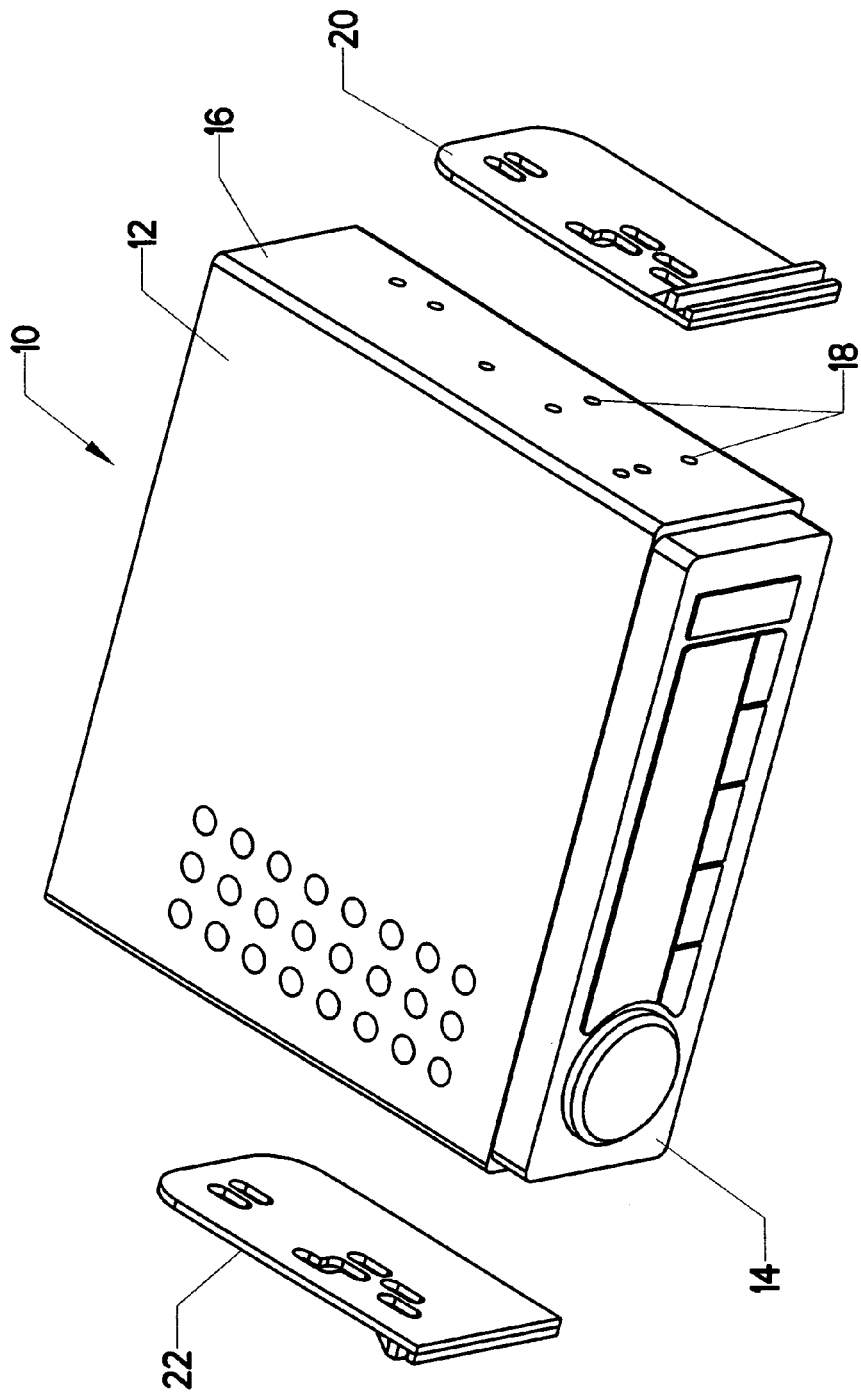
FIG. 2 is a perspective view, showing a single DIN component and mounting brackets.
Figure 2B:
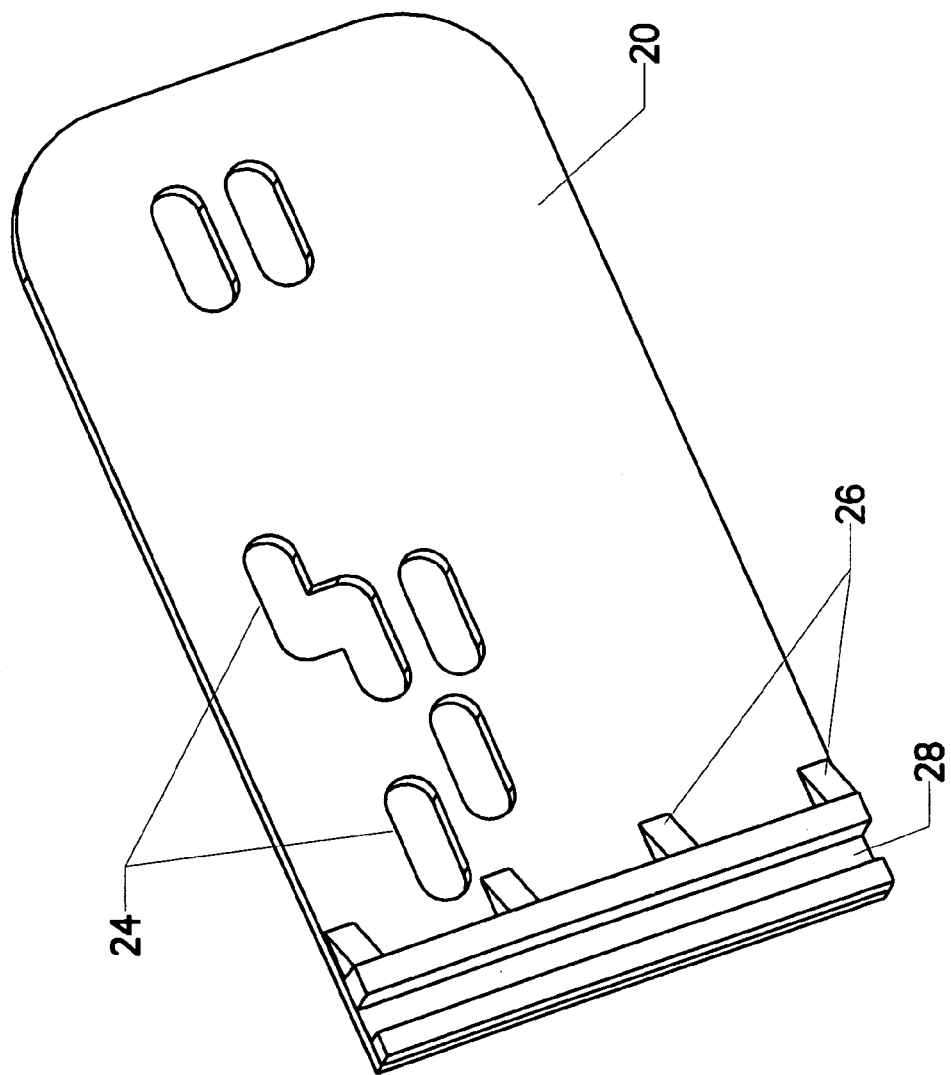
FIG. 2B is a perspective view, showing a mounting bracket for a single DIN component.
Figure 3:
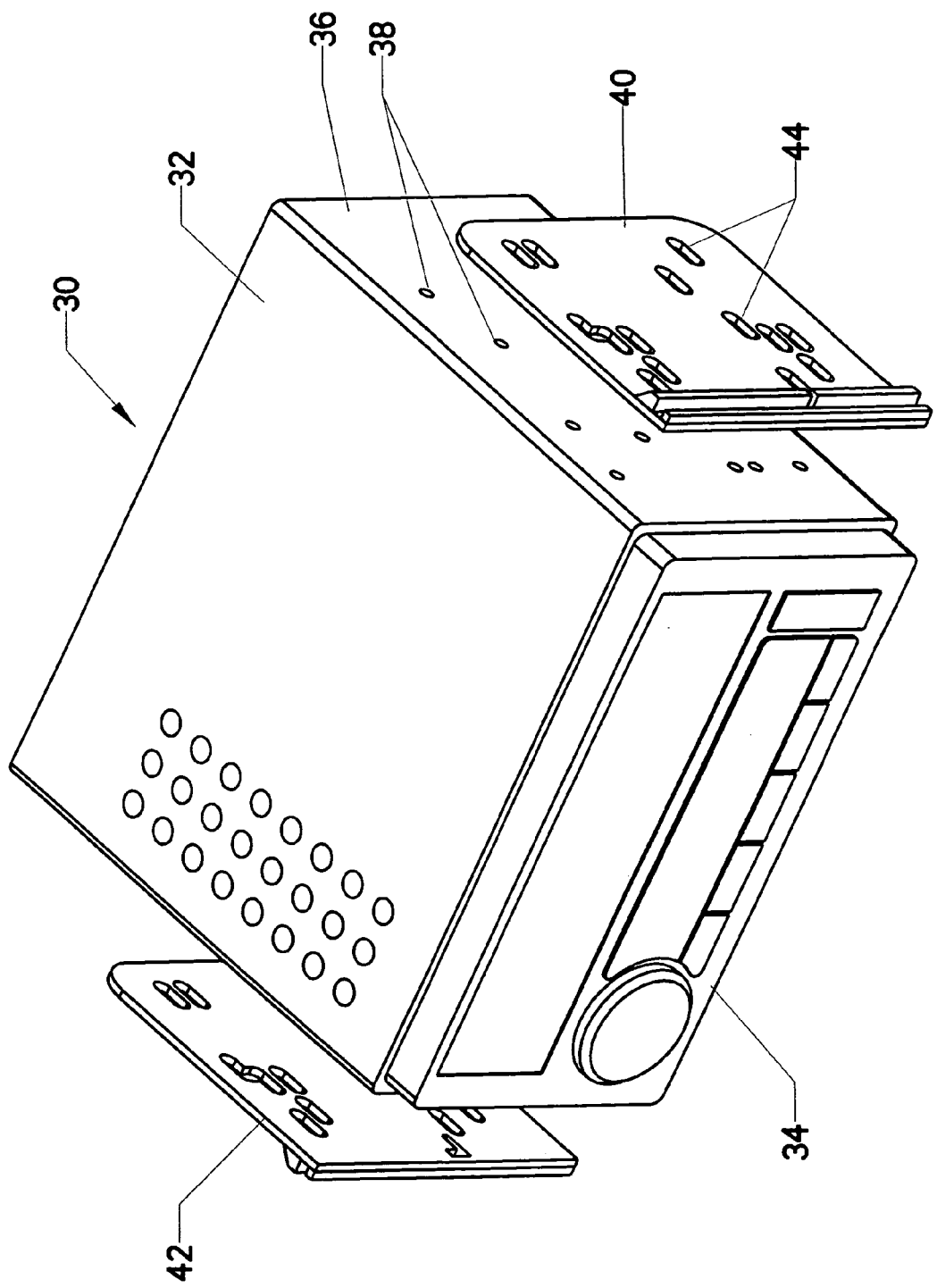
FIG. 3 is a perspective view, showing a double DIN component and mounting brackets.

Mounting brackets for mounting a single DIN component and a double DIN component are illustrated in FIG. 2 and FIG. 3, respectively. As illustrated in FIG. 2, single DIN component 10 includes main body 12 and forward facing interface panel 14. Interface panel 14 typically includes control buttons and knobs, one or more feature display screens, and an aperture for receiving a CD. Single DIN component 10 has a vertical side 16 on the left and right side of main body 12. A plurality of holes 18 are provided along each vertical side 16. Right-side mounting bracket 20 is provided for attachment to vertical side 16 on the right side of main body 12. Right-side mounting bracket 20 includes a plurality of slots 24 (shown in more detail in FIG. 2B) arranged in a configuration to match with the hole patterns used on most single DIN components. Right-side mounting bracket 20 may be attached to vertical side 16 on the right side of main body 12 by screws or other fasteners. Holes 18 are typically threaded so that a machine screw can be passed through a slot in the mounting bracket and then engage the threads within an appropriate hole.

Figure 4:
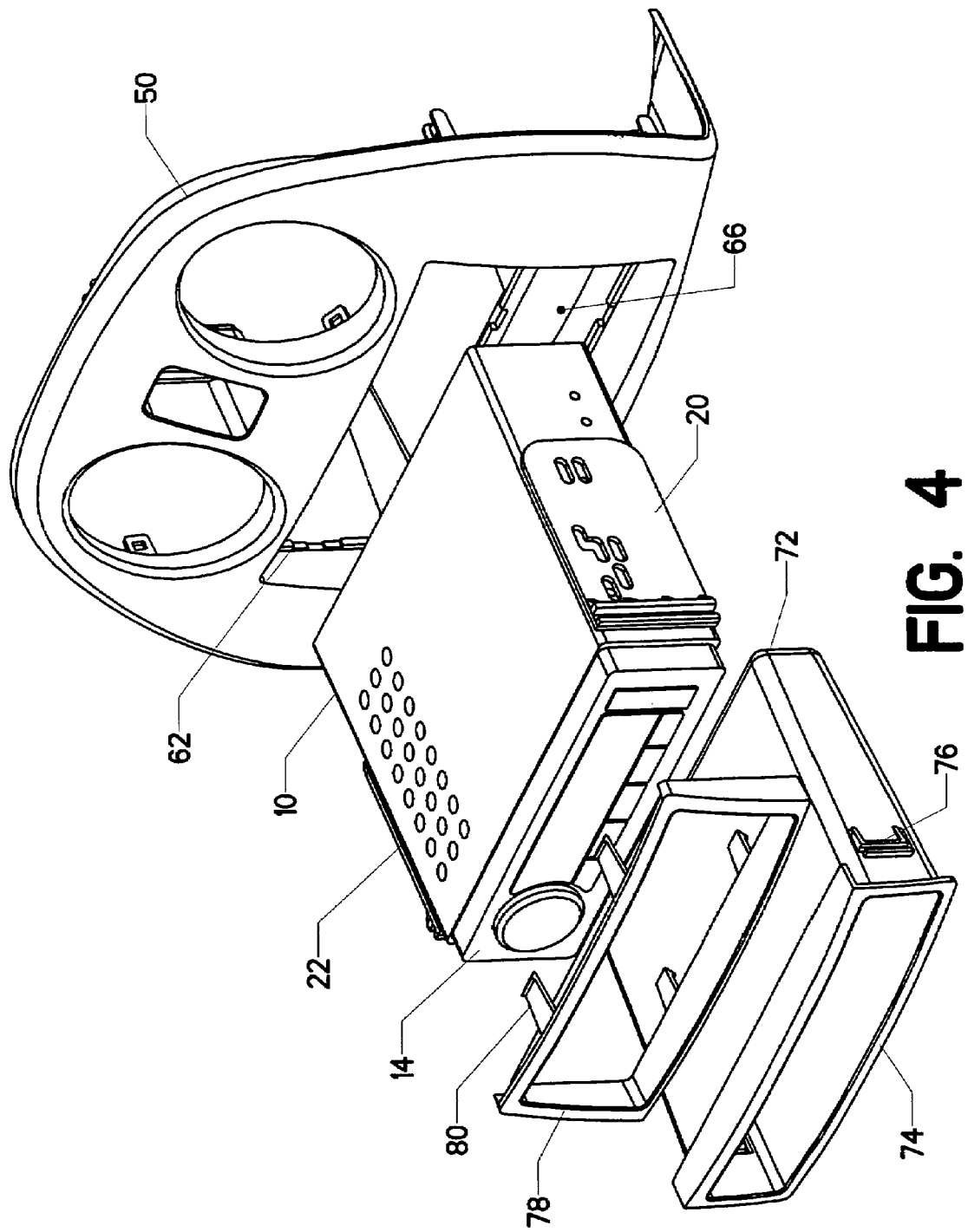
FIG. 4 is an exploded perspective view, illustrating the installation of a single DIN component and pocket.

Turning again to FIG. 2B, the reader will observe that engaging ramps 26 and groove 28 are provided on one end of right-side mounting bracket 20. FIG. 4 shows the two mounting brackets installed on a single DIN component. The assembly is positioned to slide into the single DIN aperture within the fascia and be retained therein.

Engaging ramps 26 shown in FIG. 2B cause the forward end of the mounting bracket to be pinched inward as the component is pressed into the single DIN aperture. Once the engaging ramps slide past the vertical sides, groove 28 (also shown in FIG. 2B) snaps onto vertical side 62 and securely attaches each mounting bracket to the vertical sides of the single DIN aperture. The single DIN component is thereby attached to the fascia. Left-side mounting bracket 22 is a mirror image of right-side mounting bracket 20. It operates in the same way.

Mounting brackets for attaching a double DIN component within the combination aperture are illustrated in FIG. 3. These brackets are very similar to the brackets used for single DIN component 10, except they are more particular configured to match with double DIN component 30. Double DIN component 30 includes main body 32 and forward facing interface panel 34. Main body 32 has a vertical side 36 on its left and right side. A plurality of holes 38 are provided along each vertical side 36. Right-side mounting bracket 40 has a plurality of slots 44 which are arranged to match with holes 38 and other hole pattern configurations that are commonly used on double DIN components. Holes 30 are typically threaded. Screws or other fasteners may be used to attach right-side mounting bracket 40 to vertical side 36.

Figure 3B:
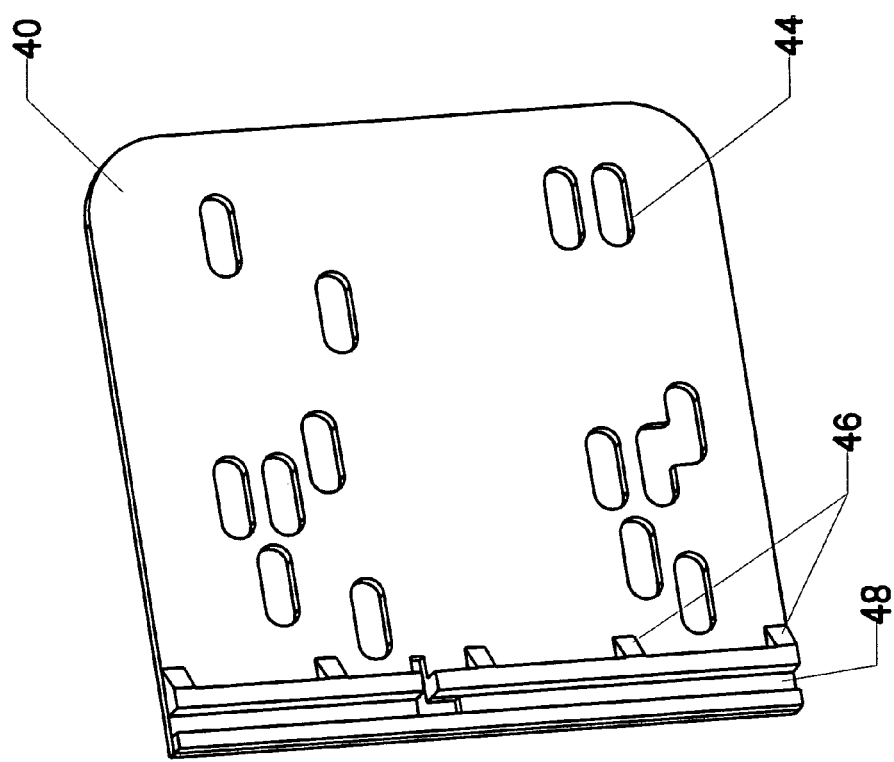
FIG. 3B is a perspective view, showing a mounting bracket for a double DIN component.

FIG. 3B shows the right-side mounting bracket 40 in more detail. Similar to the brackets for single DIN component 10, right-side mounting bracket 40 includes engaging ramps 46 and groove 48 which engage vertical sides 62 of combination aperture 56 as has been previously described. Left-side mounting bracket 42 is a mirror image of right-side mounting bracket 40.

An exploded view of the mounting kit, configured for mounting a single DIN component, is provided in FIG. 4. Right-side mounting bracket 20 and left-side mounting bracket 22 are attached to the vertical sides of single DIN component 10 by screws or other fasteners (not shown). Single DIN component 10 is then inserted into single DIN aperture 58 so that right-side mounting bracket 20 and left-side mounting bracket 22 engage with left and right vertical sides 62 of combination aperture 56, thereby securely attaching single DIN component 10 within single DIN aperture 58 as has been previously described.

Auxiliary aperture 66 remains available for placement of another item within the fascia. Pocket 72 is configured to fit within this space. The pocket is pressed into the aperture in the same manner as for the DIN component. A snap finger 76 is provided on the left and right side of pocket 72 for engaging and attaching pocket 72 to vertical sides 62 of auxiliary aperture 56. Snap finger 76 deflects inward into pocket 72 as snap finger mates with vertical side 62. Once snap finger 76 passes vertical side 62, snap finger 76 returns to its normal, undetected position, thereby securing pocket 72 within auxiliary aperture 66. Pocket 72 includes pocket trim 74 which wraps around the forward face of the pocket to give pocket 72 a more finished appearance.

When pocket 72 is secured within auxiliary aperture 66, pocket trim 74 is substantially flush with fascia 50, leaving only a small gap between the outer perimeter of combination aperture 56 and the outer perimeter of pocket trim 74. Other devices could be substituted for pocket 72, including a CD holder, an MP3 player holder, an extendable cup holder, or other similarly useful item.

Single DIN trim 78 is provided as part of the mounting kit. Single DIN trim 78 frames interface panel 14 of single DIN component 10 giving the installation a more integrated and finished appearance. Tabs 80 are provided on the top and bottom sides of single DIN trim 78. Tabs 80 snap into tab receivers 68 on the top side of combination aperture 56 and the top side of removable member 60. Tabs 80 operate similarly to snap fingers 76. The ends of tabs 80 engage tab receiver 68 causing tabs 80 to deflect inward. Once the ends of tabs 80 pass through tab receiver 68, the tabs return their normal, undeflected position, thereby securing single DIN trim 78 to fascia 50.

Figure 4B:
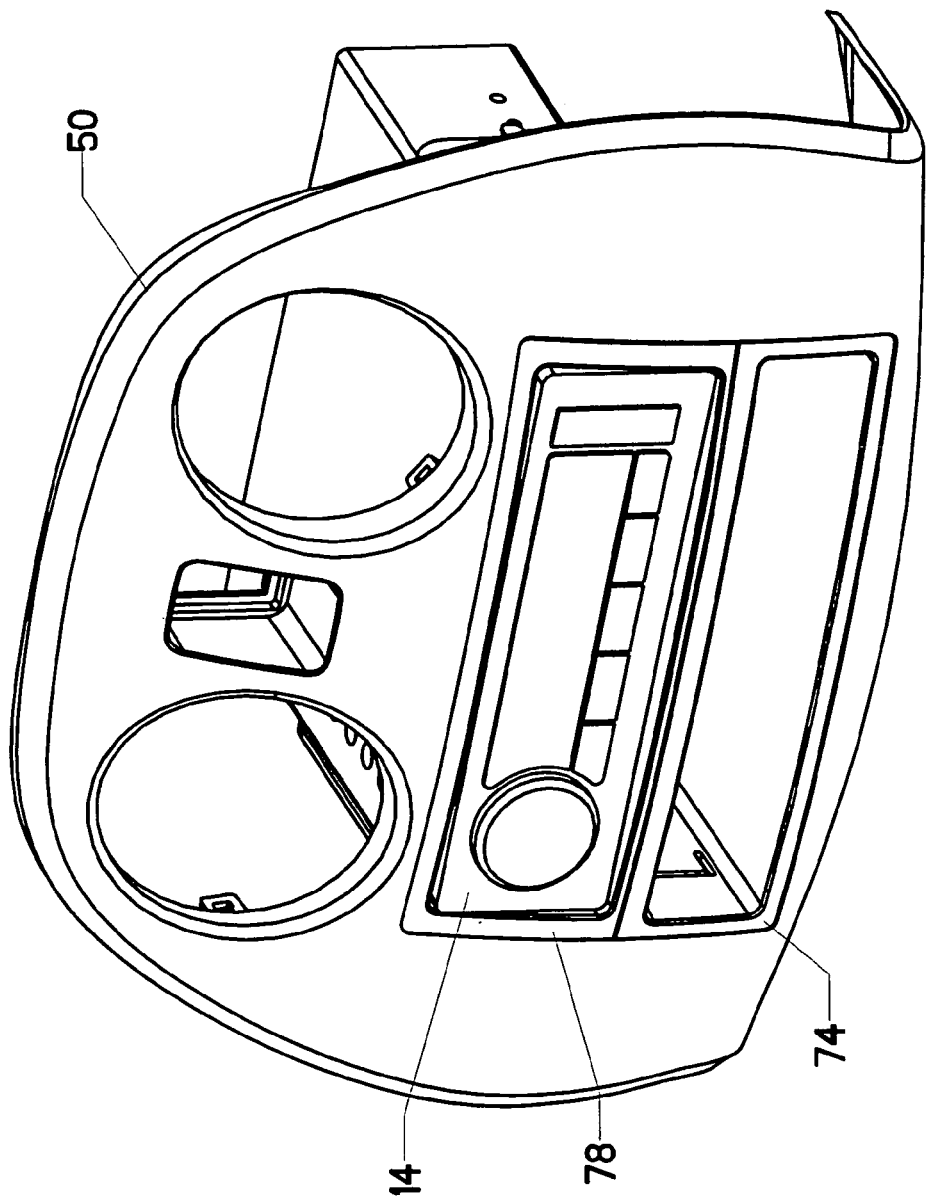
FIG. 4B is a perspective view, showing the components of FIG. 4 in an assembled state.

FIG. 4B shows the components of FIG. 4 in an assembled state. Similar to pocket trim 74, single DIN trim 78 is substantially flush with fascia 50 when single DIN trim 78 is attached around interface panel 14, leaving only a small gap between the outer perimeter of combination aperture 56 and the outer perimeter of single DIN trim 78. The single DIN component is shown with a purely vertical face, causing some discontinuity with the curved fascia in the example. Those skilled in the art will know that most modern DIN components include smoothly contoured interface panels. Thus, the transition between the component and single DIN trim 78 would actually be smoother than shown in the view.

The reader should also bear in mind that many different features could be used to attach single DIN trim 78 to the fascia. The use of four deflecting tabs should be viewed as only one example among many.

Figure 5:
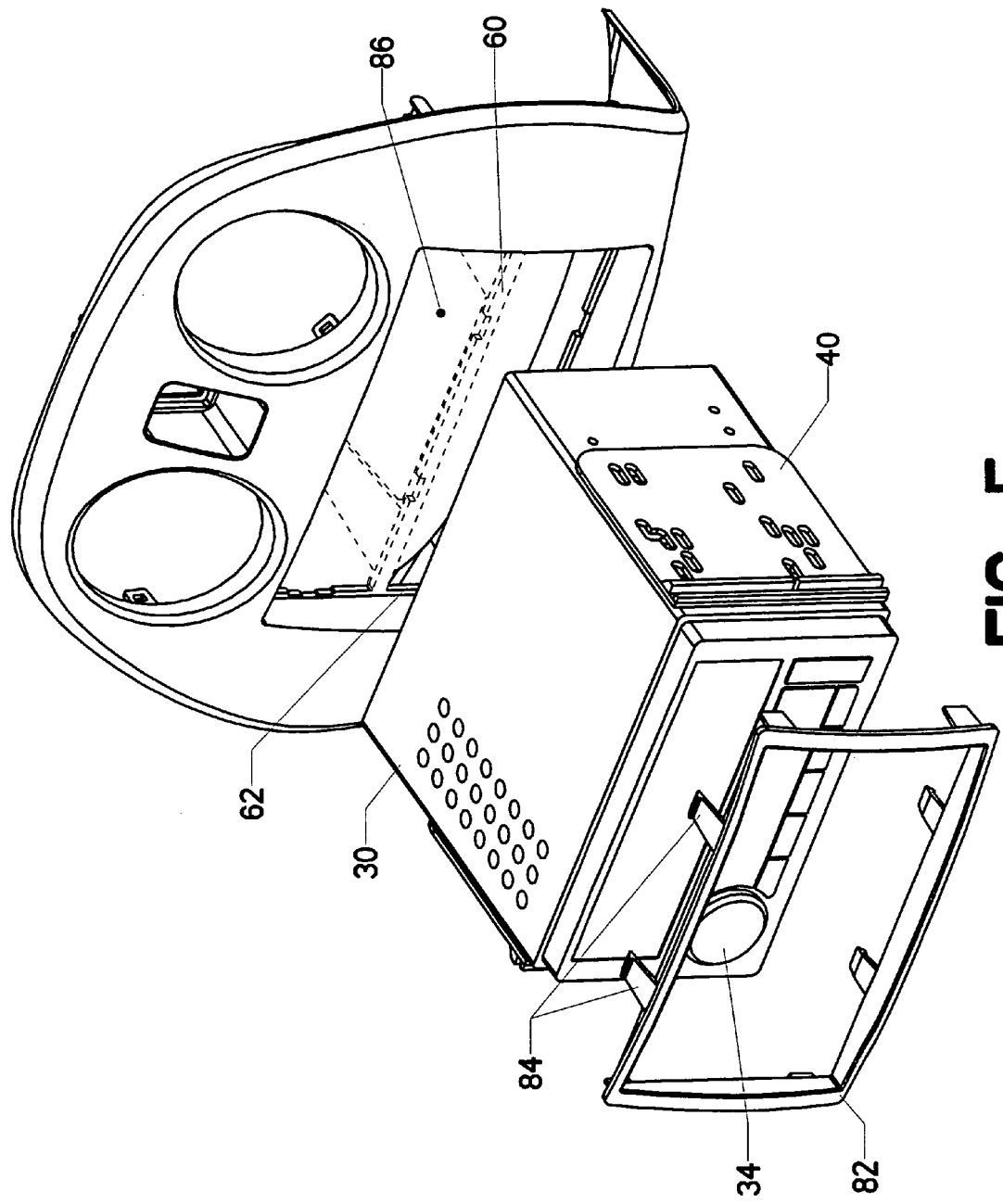
FIG. 5 is an exploded perspective view, illustrating the installation of a double DIN component.

An exploded view of the same mounting kit configured for mounting a double DIN component is provided in FIG. 5. When mounting a double DIN component, removable member 60 is removed from combination aperture 56 by cutting, melting, breaking or otherwise freeing removable member 60 from the balance of the fascia along severable joints 64. This creates double DIN aperture 86 (The position formerly occupied by removable member 60 is shown in dashed lines in the view).

Right-side mounting bracket 40 and left-side mounting bracket 42 are attached to right and left vertical sides of double DIN component 30, respectively. Double DIN component 30 is then inserted into double DIN aperture 86 so that right-side mounting bracket 40 and left-side mounting bracket 42 engage with left and right vertical sides 62 of double DIN aperture 86, thereby securely attaching double DIN component 30 within double DIN aperture 86.

Double DIN trim 82 is provided as part of the mounting kit. Double DIN trim 82 frames interface panel 34 of double DIN component 30. As with single DIN trim 78, double DIN trim 82 gives the double DIN component installation a more integrated and finished appearance. Tabs 84 are provided on the top and bottom sides of double DIN trim 82. Tabs 84 attach to tab receivers 68 on the top side and bottom side of combination aperture 56. Tabs 84 operate similarly to snap fingers 76 and tabs 80. Similar to pocket trim 74 and single DIN trim 78, double DIN trim 82 is substantially flush with fascia 50 when double DIN trim 82 is attached around interface panel 34, leaving only a small gap between the outer perimeter of combination aperture 56 and the outer perimeter of double DIN trim 82. Again, the use of four mounting tabs to attach double DIN trim 82 should be viewed as only one example among many ways in which this piece could be attached to the fascia.

Figure 5B:
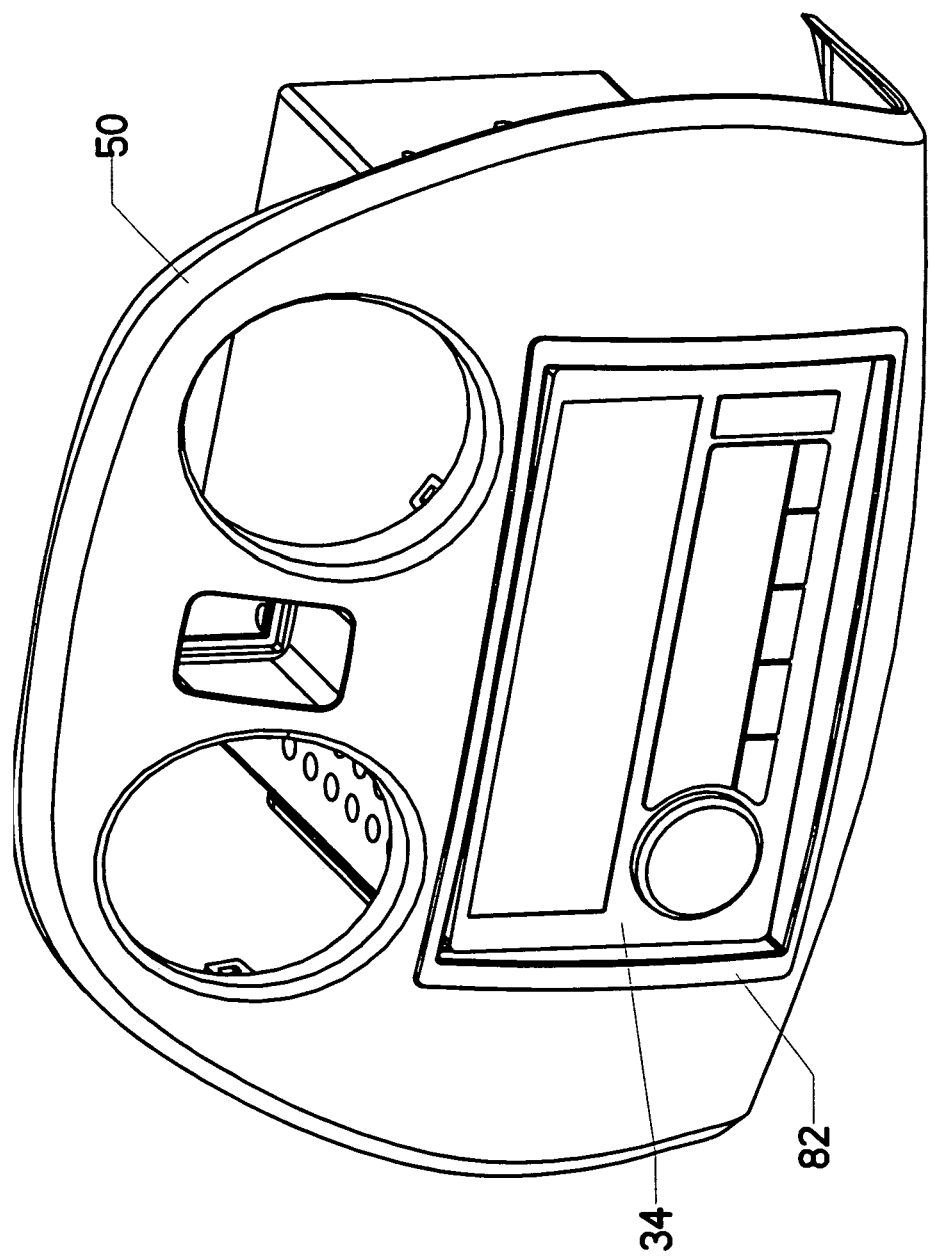
FIG. 5B is a perspective view showing the components of FIG. 5 in an assembled state.

FIG. 5B shows the assembly of FIG. 5 in an assembled state. Double DIN trim 82 makes a finished transition between the double DIN component and the balance of the fascia. As for the single DIN component, interface 34 is depicted as being a purely vertical surface. Most such components include a more rounded and blended surface facing the user. Thus, the transition between the double DIN component and the balance of the fascia is often smoother than what is depicted in FIG. 5.

The reader may wish to know more detail regarding how removable member 60 is removed from the rest of the fascia. This would typically be done by the installer. Returning to FIG. 1, the reader will observe that removable member 60 is long and thin. Thus, if the user grasps and flexes the member, it will tend to fracture at the two severable joints 64. The fractured edge may have to be dressed in some cases, such as by sanding or filing. It is also possible to include notches in the corners proximate the severable joints, so that the joints fracture in a more consistent fashion.

The user may also elect to saw through the two severable joints, which can be done quite easily since the material is fairly soft. The fascia is typically molded from thermoplastic material. Thus, it is also possible to melt through the two joints, such as by using a flat blade on a soldering gun. Other techniques can be used, so long as they leave the full double-DIN aperture unobstructed.

The preceding description contains significant detail regarding the novel aspects of the present invention. It should not be construed, however, as limiting the scope of the invention but rather as providing illustrations of the preferred embodiments of the invention. As an example, various attachment mechanisms may be used in place of tabs 84, snap fingers 76, engaging ramps 26 and 46, and grooves 28 and 48 for attaching together the various components of the proposed mounting kit. In addition, other auxiliary devices may be used in place of pocket 72 including other audio components and accessories. Such variations would not alter the function of the invention. Thus, the scope of the invention should be fixed by the following claims, rather than by the examples given.

Having described my invention, I claim:

1. A mounting kit having dual compatibility for mounting either a single DIN component or a double DIN component, said single DIN component and said double DIN component each having a left vertical side, a right vertical side and an interface panel, said mounting kit comprising:
   a. a fascia opening into a combination aperture large enough to receive said double DIN component, said combination aperture having a left vertical side and a right vertical side;
   b. a removable member extending horizontally between said left vertical side and said right vertical side of said combination aperture, said removable member having a first severable joint where said removable member attaches to said left vertical side and a second severable joint where said removable member attaches to said right vertical side;
   c. wherein said removable member divides said combination aperture into a single DIN aperture configured to receive said single DIN component and an auxiliary aperture configured to receive an auxiliary device; and
   d. wherein said combination aperture is configured to receive said double DIN component when said removable member is removed from said combination aperture.

2. The mounting kit of claim 1, further comprising:
   a. a right side mounting bracket for attachment to said right vertical side of said single DIN component;
   b. a left side mounting bracket for attachment to said left vertical side of said single DIN component; and
   c. wherein said left side mounting bracket is configured to engage said left vertical side of said combination aperture and said right side mounting bracket is configured to engage said right vertical side of said combination aperture when said left side mounting bracket and said right said mounting bracket are attached to said single DIN component and said single DIN component is inserted into said single DIN aperture, thereby securing said single DIN component within said single DIN aperture.

3. The mounting kit of claim 1, further comprising a pocket, said pocket configured to attach within said auxiliary aperture.

4. The mounting kit of claim 2, further comprising a pocket, said pocket configured to attach within said auxiliary aperture.

5. The mounting kit of claim 1, further comprising:
   a. a right side mounting bracket for attachment to said right vertical side of said double DIN component;
   b. a left side mounting bracket for attachment to said left vertical side of said double DIN component; and
   c. wherein said left side mounting bracket is configured to engage said left vertical side of said combination aperture and said right side mounting bracket is configured to engage said right vertical side of said combination aperture when said left side mounting bracket and said right said mounting bracket are attached to said double DIN component and said double DIN component is inserted into said combination aperture after said removable member has been removed, thereby securing said double DIN component within said combination aperture.

6. The mounting kit of claim 1, further comprising a single DIN trim piece configured to wrap around said interface panel of said single DIN component and attach to said combination aperture when said single DIN component is attached within said single DIN aperture.

7. The mounting kit of claim 2, further comprising a single DIN trim piece configured to wrap around said interface panel of said single DIN component and attach to said combination aperture when said single DIN component is attached within said single DIN aperture.

8. The mounting kit of claim 1, wherein said fascia is shaped to conform to the dash of a specific automobile.

9. The mounting kit of claim 2, wherein said fascia is shaped to conform to the dash of a specific automobile.

10. The mounting kit of claim 1, further comprising a double DIN trim piece configured to wrap around said interface panel of said double DIN component and attach to said combination aperture when said removable member is removed and said double DIN component is attached within said combination aperture.

11. A mounting kit having dual compatibility for mounting either a single DIN component with an auxiliary device or a double DIN component by itself, said single DIN component and said double DIN component each having a left vertical side, a right vertical side and an interface panel, said mounting kit comprising:
   a. a combination aperture large enough to receive said double DIN component, said combination aperture having a left vertical side and a right vertical side, said combination aperture changeable between a first configuration and a second configuration;
   b. wherein in said first configuration, said combination aperture is configured to receive and mount said single DIN component and said auxiliary component together within said combination aperture; and
   c. wherein in said second configuration, said combination aperture is configured to receive and mount said double DIN component;
   (d) a removable member extending horizontally between said left vertical side and said right vertical side of said combination aperture, said removable member having a first severable joint where said removable member attaches to said left vertical side and a second severable joint where said removable member attaches to said right vertical side; and
   (e) wherein said removable member divides said combination aperture into a single din aperture configured to receive said single DIN component and an auxiliary aperture configured to receive said auxiliary device.

12. The mounting kit of claim 11, further comprising a pocket, said pocket configured to attach within said auxiliary aperture.

13. The mounting kit of claim 11, wherein said fascia is shaped to conform to the dash of a specific automobile.

14. The mounting kit of claim 11, further comprising:
   a. a right side mounting bracket for attachment to said right vertical side of said single DIN component;
   b. a left side mounting bracket for attachment to said left vertical side of said single DIN component; and
   c. wherein said left side mounting bracket is configured to engage said left vertical side of said combination aperture and said right side mounting bracket is configured to engage said right vertical side of said combination aperture when said left side mounting bracket and said right said mounting bracket are attached to said single DIN component and said single DIN component is inserted into said single DIN aperture, thereby securing said single DIN component within said single DIN aperture.

15. The mounting kit of claim 11, further comprising:
   a. a right side mounting bracket for attachment to said right vertical side of said double DIN component;
   b. a left side mounting bracket for attachment to said left vertical side of said double DIN component; and
   c. wherein said left side mounting bracket is configured to engage said left vertical side of said combination aperture and said right side mounting bracket is configured to engage said right vertical side of said combination aperture when said left side mounting bracket and said right said mounting bracket are attached to said double DIN component and said double DIN component is inserted into said combination aperture after said removable member has been removed, thereby securing said double DIN component within said combination aperture.

* * * * *